United States Patent
Bhanu et al.

(10) Patent No.: US 8,024,487 B2
(45) Date of Patent: Sep. 20, 2011

(54) SMART SCAN FOR WIRELESS DEVICES

(75) Inventors: Vivek Bhanu, Bellevue, WA (US); Siamak Poursabahian, Redmond, WA (US); Edwin A. Hernandez-Mondragon, Tegucigalpa (HN); John W. Archer, Lynnwood, WA (US); Lambert H. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2521 days.

(21) Appl. No.: 10/724,843

(22) Filed: Dec. 1, 2003

(65) Prior Publication Data

US 2005/0120119 A1 Jun. 2, 2005

(51) Int. Cl.
G06F 15/16 (2006.01)
(52) U.S. Cl. .................................................. 709/250
(58) Field of Classification Search .................. 709/250
See application file for complete search history.

(56) References Cited

U.S. PATENT DOCUMENTS

| | | | |
|---|---|---|---|
| 6,879,570 B1* | 4/2005 | Choi | 370/329 |
| 7,193,989 B2* | 3/2007 | Melpignano | 370/350 |
| 2002/0176445 A1 | 11/2002 | Melpignano | |
| 2003/0060222 A1* | 3/2003 | Rune | 455/517 |
| 2003/0092386 A1* | 5/2003 | Miklos et al. | 455/41 |
| 2003/0099212 A1* | 5/2003 | Anjum et al. | 370/328 |
| 2003/0124978 A1* | 7/2003 | Virtanen | 455/41 |
| 2004/0247023 A1* | 12/2004 | Sasai et al. | 375/220 |
| 2006/0089119 A1* | 4/2006 | Lipasti et al. | 455/410 |

OTHER PUBLICATIONS

Jonvik et al. "Bluetooth PAN and external IP networks."; Mobile and Wireless Communications. IFIP TC6/WG.8 Working Conference on Personal Wireless Communications (PWC'2002), Singapore, Oct. 23-25, 2002.*
Bluetooth SIG, Inc. Bluetooth Network Encapsulation Protocol (BNEP) Specification. Version 1.0 (Feb. 14, 2003). Available: https://www.bluetooth.org/, Dec. 1, 2003.
Bluetooth SIG, Inc. Bluetooth Personal Area Networking Profile. Version 1.0 (Feb. 14, 2003). Available: https://www.bluetooth.org/, Dec. 1, 2003.
Bluetooth SIG, Inc. Specification of the Bluetooth System. Version 1.0 (Dec. 1, 1999). Available: https://www.bluetooth.org/, Dec. 1, 2003.
Bluetooth SIG, Inc. Specification of the Bluetooth System. Version 1.2 (Nov. 5, 2003). Available: https://www.bluetooth.org/, Dec. 1, 2003.
U.S. Appl. No. 10/693,655, filed Oct. 24, 2003, Krantz et al.

(Continued)

*Primary Examiner* — Andrew Caldwell
*Assistant Examiner* — Lin Liu
(74) *Attorney, Agent, or Firm* — Wolf, Greenfield & Sacks, P.C.

(57) ABSTRACT

A system and method for discovering and connecting to a preferred remote Bluetooth device by a local Bluetooth device. An inquiry scan cache and a page scan cache are maintained. The inquiry scan cache is updated by way of a periodic inquiry scan. The page scan cache is refreshed by way of an attempt to connect to the preferred remote Bluetooth device. Periodically, and more frequently than the periodic inquiry scan, a list of available remote Bluetooth devices is formed from entries in the inquiry scan cache concatenated with each entry in the page scan cache for which a page scan is successful. In one embodiment, the page scan cache holds a finite number of entries, and an expiration policy is applied to each added entry. In another embodiment, the inquiry scan cache is also updated when a remote Bluetooth device attempts to connect to the local Bluetooth device.

21 Claims, 7 Drawing Sheets

OTHER PUBLICATIONS

U.S. Appl. No. 10/725,099, filed Dec. 1, 2003, Poursabahian et al.
Bluetooth Special Interest Group. *Bluetooth Protocol Architecture*, Version 1.0 (Sep. 29, 1999). Available at <https://www.bluetooth.org/foundry/sitecontent/document/Protocol_Architecture>.
European Search Report from application No. EP04025582.0 dated May 19, 2010.
IEEE Standards "IEEE Standard for Information Technology Telecommunications and Information Exchange between systems—Local and metropolitan area networks—Specific Requirements" Jun. 14, 2002, 1147 pages.
Bluetooth "Specification of the Bluetooth System" Feb. 22, 2001, 450 pages.
HePing Shi, XiuFang Ma, "The Lecture on Bluetooth Technology", *China Data Communication*, vol. 3, 2002, Publication date of which is Mar. 31, 2002.
Decision of Rejection in Chinese application 200410100615.8 dated Jan. 29, 2010.
Office Action from Chinese Application No. 200410100615.8 dated Apr. 10, 2009.
Sun, G. et al;, Analysis of the Mechanism of the Bluetooth Baseband Data Communication, Application of Electronic Technique, vol. 4, 2003.

* cited by examiner

SMART SCAN FOR WIRELESS DEVICES

TECHNICAL FIELD

The present invention relates generally to wireless networks for Bluetooth radio-equipped devices, and more particularly to techniques by which a Bluetooth device may discover and connect to other Bluetooth devices.

BACKGROUND

Bluetooth is a short-range wireless technology that uses the 2.4 GHz Industrial, Scientific and Medical (ISM) band. Bluetooth is particularly intended for small mobile devices such as notebook computers, mobile phones, and personal digital assistants (PDAs). Pseudo-random frequency-hopping techniques are employed by communicating Bluetooth devices to minimize the effects of signal interference in the ISM band. The Bluetooth technology is set forth in detail in Bluetooth Special Interest Group (SIG), *Specification of the Bluetooth System* (hereinafter "the Bluetooth Specification"), Version 1.0, Dec. 1, 1999, and Version 1.2, Nov. 5, 2003, incorporated herein by reference.

The Bluetooth Personal Area Networking Profile (hereinafter "the PAN Profile") provides a conceptual basis on which two or more Bluetooth-enabled devices can form and participate in personal area networks (PANs), allowing them to interoperate and exchange data. (See Bluetooth SIG, *Personal Area Networking Profile*, Version 1.0, Feb. 14, 2003, incorporated herein in its entirety by reference.) The PAN Profile describes three roles that a Bluetooth device may perform: Network Access Point (NAP), Group Ad-hoc Network (GN), and Personal Area Network User (PANU). NAP and GN correspond to services that may be used by a Bluetooth device operating as a client PANU. "NAP", "GN," and "PANU" will be used hereinafter to refer to the Bluetooth-equipped node providing the respective NAP, GN or PANU service.

In the Bluetooth context, a NAP is a device that contains one or more Bluetooth radio devices and acts as a bridge, proxy or router to a second network (such as a 10BaseT Ethernet LAN) with respect to one or more PANUs with a Bluetooth wireless connection to the NAP. Each such PANU thereby may gain access to the second network's shared resources. A GN is a collection of Bluetooth devices that interact with one another to form a self-contained temporary wireless network (or "piconet") without the use of additional networking hardware or infrastructure. In both the NAP and the GN scenarios, data exchange is by way of the Bluetooth Network Encapsulation Protocol (BNEP), which provides for encapsulation of Ethernet packets. (See Bluetooth SIG, *Bluetooth Network Encapsulation Protocol (BNEP) Specification*, Version 1.0, Feb. 14, 2003, incorporated herein in its entirety by reference.)

There are a number of different ways in which one Bluetooth device may select another Bluetooth device in order to establish a connection to the second device. One desirable feature is for the first device to maintain a list of preferred devices or networks from which a selection can be made. While an application running on a Bluetooth device may make an explicit request to discover, select and form a connection to a particular Bluetooth device, applications merely requiring connectivity to enable their networked features benefit from the device having an automatic configuration service to establish connectivity. Moreover, a common, unified automatic configuration service for the various wireless technologies available to a device is desirable. Certain features and embodiments of such a unified service have been disclosed in U.S. patent application Ser. No. 10/693,655, "Network and Interface Selection on a Computing Device Capable of Establishing Connections Via Multiple Network Communications Media," filed Oct. 24, 2003, having certain inventors and an assignee in common with the present invention, and incorporated herein by reference.

One drawback to Bluetooth technology is its relatively time-intensive device discovery phase of establishing a connection to an in-range Bluetooth device. In general, to discover new Bluetooth-capable devices (for which address and low-level state information is not already known), an inquiry scan is performed at the Baseband level, the lowest layer of the Bluetooth networking protocol stack. Once a list of discovered devices has been obtained by way of an inquiry scan, a page scan can be performed with respect to a selected device. Following a page scan, a local device and remote device can enter a connection state.

Under the specifications for the Baseband in the Bluetooth Specification, the inquiry process time is significantly longer than the page process time. Depending on the underlying hardware and the number of discoverable devices within radio range, the inquiry process may take up to 30.72 seconds under version 1.0 of the Bluetooth Specification, while the maximum time for the paging process is 2.56 seconds. The inquiry phase thus substantially dominates the time spent in scanning for in-range Bluetooth devices, and can lead to unacceptable delays for a device user waiting for a connection to occur over a local Bluetooth PAN device. It is desirable, then, to minimize the time spent in the inquiry scan phase when discovering, selecting and connecting to preferred Bluetooth devices.

SUMMARY OF THE INVENTION

The following provides a simplified summary of certain embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is provided below.

In accordance with embodiments of the invention, a system and method for discovering and connecting to a preferred remote Bluetooth device by a local Bluetooth device are provided. An inquiry scan cache and a page scan cache are maintained. The inquiry scan cache is refreshed by a periodic inquiry scan; in an embodiment, the inquiry scan cache is also updated when a remote Bluetooth device attempts to connect to the local Bluetooth device. The page scan cache is refreshed by way of an attempt to connect to the preferred device. Periodically, and more frequently than the periodic inquiry scan, a list of visible remote Bluetooth devices is produced by performing a page scan for each entry in the page scan cache, adding successful page scan attempts to the list, to which is concatenated the contents of the inquiry scan cache. In certain embodiments the list of visible devices is formed and reported in response to polling by an automatic configuration service.

In accordance with an embodiment of the present invention, the page scan cache holds a finite number of entries and is associated with an expiration policy. For each entry added to the page scan cache, an expiration time is set. If the periodic inquiry scan does not reveal the entry, the expiration time is reduced by a given amount; if the expiration time has occurred, the entry is removed from the page scan cache.

Computer-readable media embodying the aspects of the system and method summarized above are also provided. The invention may be implemented as a user-mode PAN service component, and in association with a kernel-mode PAN driver.

Other features of the invention will become apparent from the following detailed description when taken in conjunction with the accompanying drawings, of which:

DETAILED DESCRIPTION

In the following description, embodiments of the present invention will be described. For purposes of explanation, certain specific configurations and details are set forth in order to provide an adequate understanding of the presented embodiments. However, it will also be apparent to those having skill in the art that the present invention may be practiced without inclusion of those configurations and details. Furthermore, well-known features, and particularly features well-known to practitioners of ordinary skill in the computing and computer networking arts, may be omitted or simplified in order not to obscure the embodiment being described.

Figure 1:
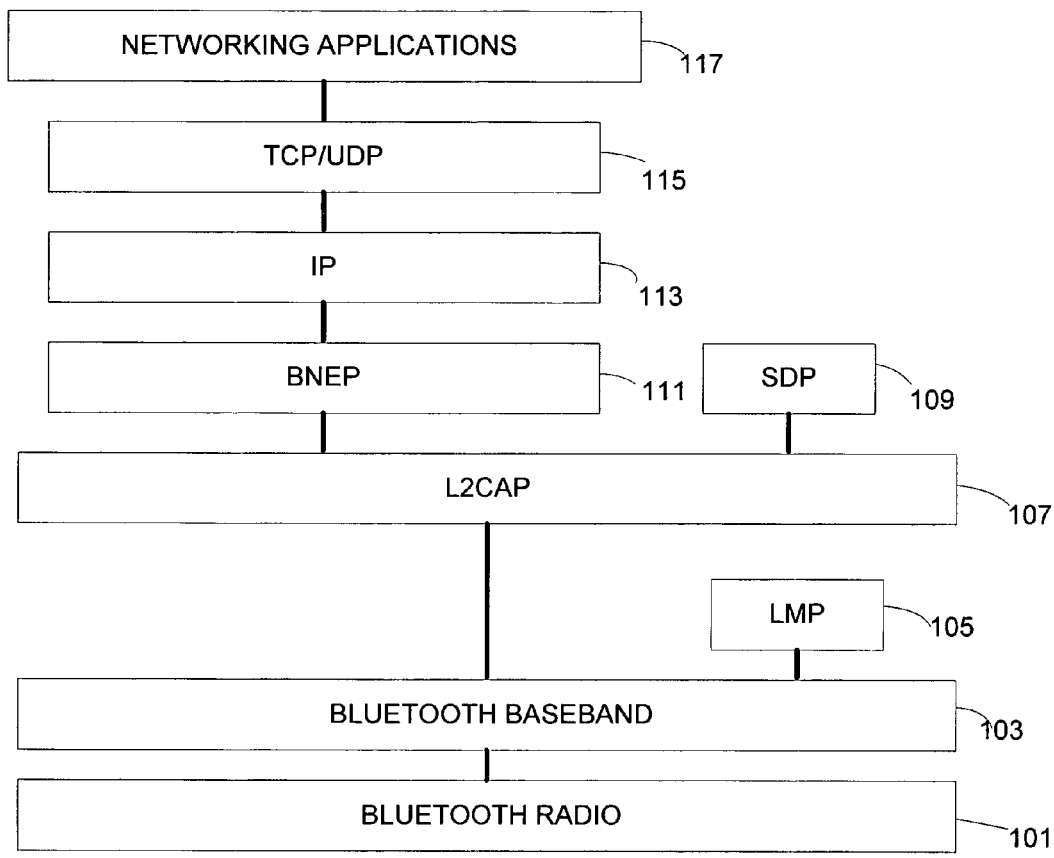
FIG. 1 is a block diagram providing an illustration of components of the Bluetooth network protocol stack in PAN setting.

FIG. 1 provides an illustration of components of the multi-layered Bluetooth network protocol stack in a PAN setting involving IP traffic over Bluetooth. Embodiments of the present invention are situated within Bluetooth radio-equipped computing devices that implement this protocol stack. The components of the Bluetooth protocol stack are described in detail in the Bluetooth Specification and associated documents of the Bluetooth SIG or else are well-known, and will only be described in brief here. At the lowest level is the Bluetooth radio frequency layer 101. The Baseband protocol 103 enables the physical link to form a piconet with one or more other Bluetooth devices. As mentioned above, the inquiry and paging processes take place at the Baseband layer 103.

The Link Manager Protocol (LMP) 105 is responsible for link setup between Bluetooth nodes. LMP 105 handles the control and negotiation of packet sizes used when transmitting data. It also manages power modes and power consumption, as well as security features such as authentication and encryption. The LMP 105, Baseband 103 and Bluetooth radio 101 are typically implemented in Bluetooth hardware modules.

When a connection is established, the Logical Link Control and Adaptation Protocol (L2CAP) 107 provides connection-oriented and connectionless data services to upper layer protocols. L2CAP 107 implements a second link-layer protocol to address protocol multiplexing, segmentation, and reassembly. L2CAP serves as the Bluetooth data medium access control (MAC) layer. The Service Discovery Protocol 109 defines methods for discovering services available from or through Bluetooth devices. BNEP 111 encapsulates packets from various upper-layer network protocols, such as IPv4 and IPv6 113, so that they may be transported directly over the L2CAP 107. As illustrated in FIG. 1, networking applications 117 are transported over TCP/UDP 115 and IP 113. BNEP 111 provides an Ethernet-like interface to the IP layer 113.

Figure 2A:
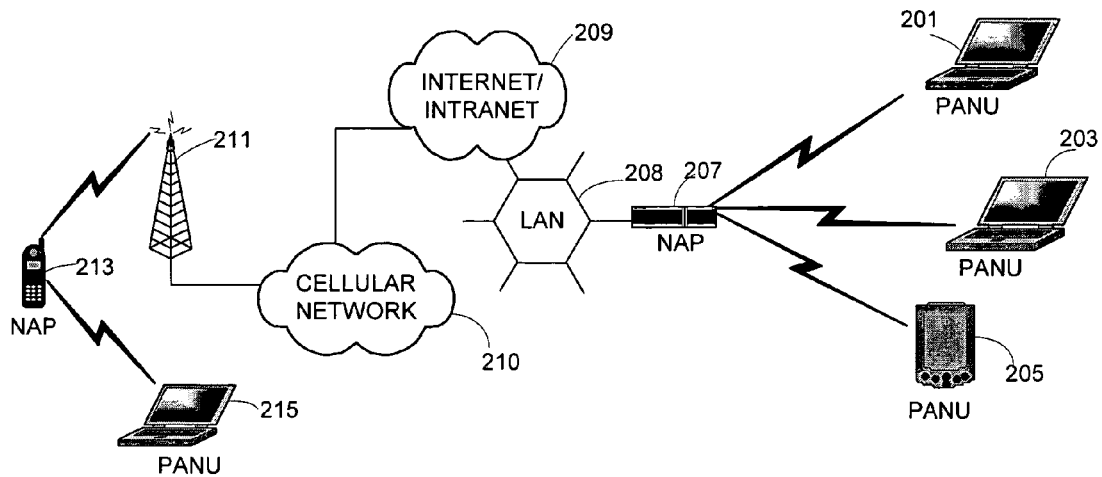
FIG. 2A is a diagram representing exemplary NAP PAN scenarios.
Figure 2B:
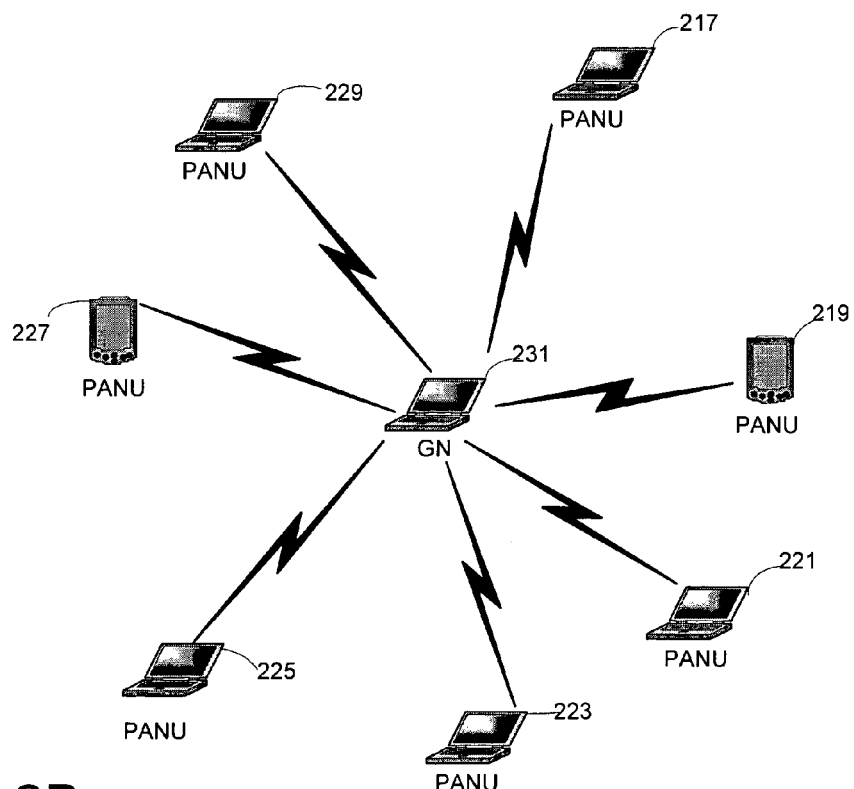
FIG. 2B is a diagram representing an exemplary GN PAN scenario.

FIGS. 2A and 2B illustrate exemplary topologies for the NAP PAN scenario and GN PAN scenario, respectively, as discussed above in the background section. Embodiments of the present invention may be practiced in either a NAP or a GN setting. In FIG. 2A two NAP-based Bluetooth networks are depicted. A Bluetooth access point 207 has a wired connection to a LAN 208 which is in turn linked to an IP-based network 209, which may be, for example, a corporate intranet or the larger Internet. Access to these other networks 208, 209 through the NAP device 207 is provided to the notebook PANU devices 201, 203 and the PDA PANU device 205. The other Bluetooth network depicted in FIG. 2A comprises the notebook PANU device 215 and the cellular phone 213, functioning as a NAP. The cellular phone 213 has a wireless link by way of the cell tower 211 to a cellular WAN 210, such as the IP-based General Packet Radio Service (GPRS), which is linked to the IP network 209.

FIG. 2B depicts a GN-based piconet comprising eight Bluetooth-equipped devices: notebooks 217, 221, 223, 225, 229, 231, and PDAs 219, 227. The notebook 231 provides the GN service, here operating as the piconet master with respect to slave PANU devices 217, 219, 221, 223, 225, 227, 229. The seven slave devices represent the maximum number of active slaves in a piconet.

Figure 3:
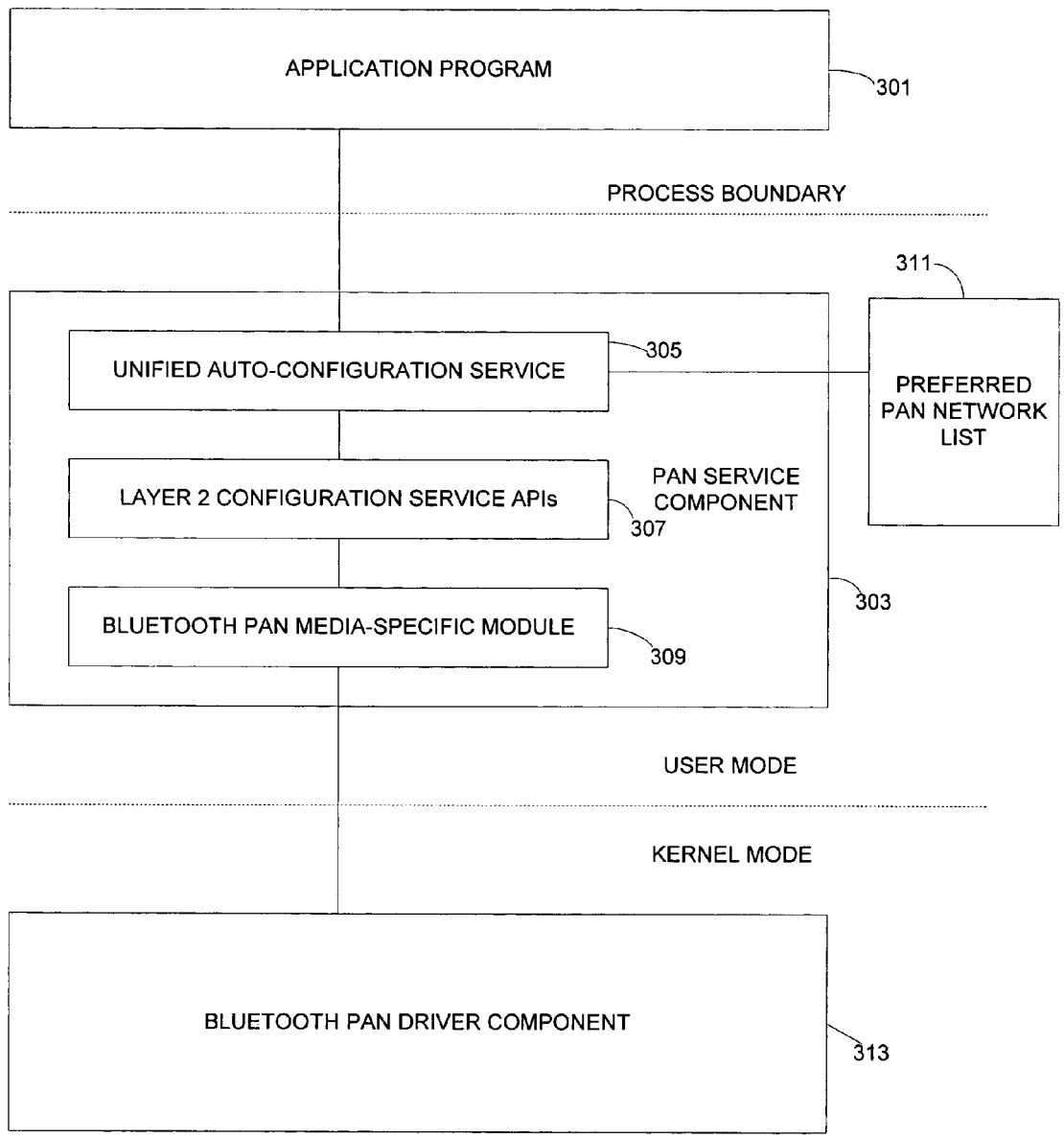
FIG. 3 is a block diagram illustrating the architecture of an exemplary embodiment of a Bluetooth PAN implementation within the context of which the present invention may be practiced.

FIG. 3 illustrates the architecture of an embodiment of a Bluetooth PANU implementation within the context of which the present invention may be practiced. The implementation comprises two basic components, a kernel-mode PAN driver 313 and a user-mode PAN service 303. The PAN service 303 provides for automatic connectivity to a remote Bluetooth device having an appropriate profile role and automates the task of configuring a network interface card in accordance with a set of rules saved by the user. In the depicted embodiment, the service 303 implements and extends API configuration primitives common to other wireless technologies in a unified autoconfiguration service 305 unifying multi-network roaming and rules engine heuristics to control all network connectivity interfaces being used. In an initialization phase of the PAN service component 303, the autoconfiguration service 305 loads a preferred PAN remote network device list 311 from a repository. Connections are attempted to currently visible networks in the list 311 in the listed preference order.

The autoconfiguration service 305 controls a PAN media-specific module 309 that is loaded by a layer 2 configuration service component 307. The media-specific module 309 abstracts away the functionality of the PAN driver 313 and provides the autoconfiguration service 305 with media-specific APIs for discovery of, attachment to and disconnecting from remote Bluetooth devices. The PAN driver 313 negotiates IP connectivity with a remote Bluetooth device. In an embodiment, the driver 313 is an NDIS miniport driver for the Microsoft® Windows platform. The driver 313 exposes an Ethernet interface on its upper path and interacts with Bluetooth L2CAP and Baseband levels on its lower path. Certain features of embodiments of such a driver are disclosed in U.S. patent application Ser. No. 10/725,099, filed on the same date as the present application, having certain inventors in common with those of the present application, and having a common assignee.

As explained in the background section above, scanning for available Bluetooth PAN network devices may be a fairly lengthy process depending on the underlying hardware. The present invention is directed to a system and method for a "smart scan" for PAN devices. In implementations of a PAN system of the sort illustrated in FIG. 3, this smart scan can be performed by the PAN media-specific module 309, but the present invention is not limited to implementations so structured. Rather, the invention is applicable generally to local Bluetooth PAN devices that maintain lists of preferred networks. For illustrative purposes, the invention will be described in the general context of a PAN service implementation similar to that presented in FIG. 3. Those having skill in the art will recognize its broader applicability.

An automated configuration service, such as the unified autoconfiguration service 305 depicted in FIG. 3, necessarily performs a periodic scan for visible network devices. In order for it to be of practical use to a possibly mobile user wishing to connect to possibly mobile devices, the scanning period cannot be too long in duration, as visible remote device information can change quickly. On a local machine with multiple devices for wireless connectivity and with a representative implementation of a unified autoconfiguration service in association with which the present invention may be practiced, the autoconfiguration service polls each device for a list of visible remote devices once every 90 seconds. A trivial approach would be to translate the scanning primitive exposed by the PAN media-specific module into a Baseband inquiry scan. However, because the inquiry process may take approximately 30 seconds for a complete list of visible remote Bluetooth devices, this trivial solution would result in poor data performance, given the disruptiveness of scans in the Bluetooth setting.

The basic procedure by which the illustrative autoconfiguration service performs discovery of and connection to preferred networks is as follows:
While connections are possible on a local device:
Scan for visible networks on that device;
For each preferred network,
for each available network,
if there is a match between the current preferred network and the current visible network,
connect to the preferred network;
Sleep (90 seconds).
This procedure is illustrated in the flow diagram of FIG. 4. The present invention involves an elaboration on this procedure, as will be explained further below. For simplicity, FIG. 4 ignores the possibility of other wireless media-specific modules on the local host. While connections are still possible on the local device (step 401), the body of the procedure is entered. At step 403 a scan for visible networks is undertaken, yielding a list of available remote devices. For each preferred network in the preferred network list, the preferred network is compared to each visible network. If the currently-examined preferred network matches the currently-examined visible network (step 405), a connection is made to the preferred network (step 407). If there is no match, and if there are unexamined networks remaining on the visible network list (step 409), the next visible network is considered (step 411), with the procedure returning to step 405. If all visible networks have been considered, and if all preferred networks have not been exhausted (step 413), the next network on the preferred network list is examined (step 415), with the procedure returning to step 405. If a match is found at step 405, or if there are no further remaining preferred networks (step 413), the procedure sleeps for 90 seconds (step 417) and then returns to step 401.

The time required to scan for networks can be reduced if the local PAN device makes use of page scanning, which is device-specific. If the preferred list were known in advance, the local PAN device could then attempt to perform a page for each entry in the preferred list. However, this solution is not feasible. It would no longer be possible to discover new devices and add them to the list of preferred networks, whether or not an autoconfiguration service is used. Moreover, in the case of embodiments employing a unified autoconfiguration service, the Bluetooth media-specific module would break the abstraction of the unified service. Thus, a solution other than pure-inquiry or pure-page is required.

Figure 5:
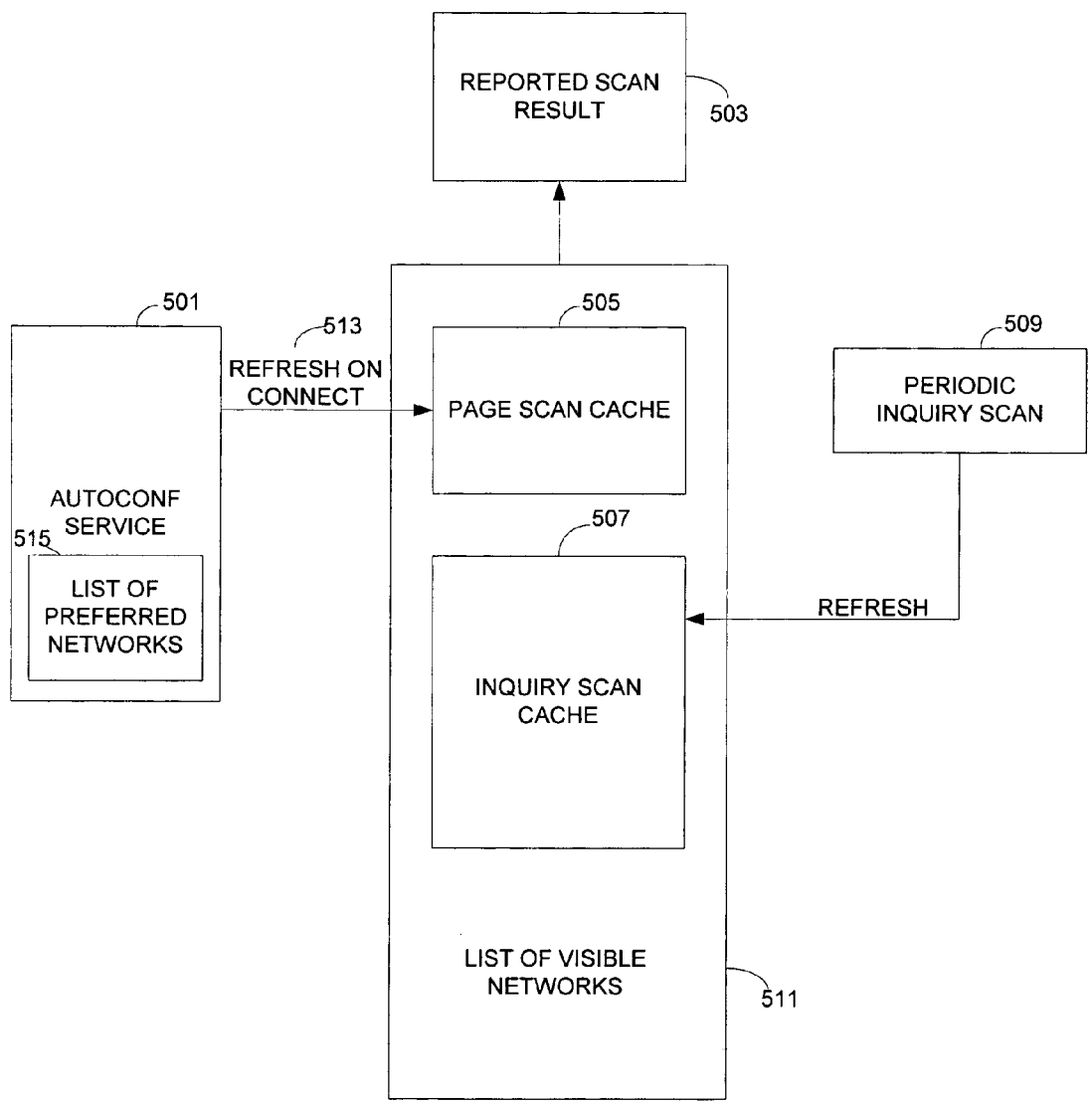
FIG. 5 is a block diagram generally illustrating the architecture of an efficient and practical Bluetooth PAN smart scan in accordance with an embodiment of the present invention.

The diagram of FIG. 5 conceptually illustrates the architecture of a system in accordance with an embodiment of the present invention, making possible an efficient as well as practical approach to scanning for Bluetooth PAN network devices. Embodiments of the depicted system form part of a Bluetooth PAN media-specific module within a multi-technology autoconfiguration system, as illustrated in FIG. 3. Other embodiments exist in association with such an autoconfiguration system, or with other kinds of network device configuration systems.

A list of preferred networks 515, as described above, is stored in or by the system. In addition, two caches are maintained, a Page Scan Cache 505 and an Inquiry Scan Cache 507. Every attempt to connect to a remote Bluetooth device (as by way of the Bluetooth PAN media-specific module) will result in the specified network being added to the Page Scan Cache 505, if it was not already present in that cache. The connection request would then proceed in a normal fashion. On initialization of the PAN media-specific module, or its equivalent, the results of an inquiry scan are stored in the Inquiry Scan Cache 507. As represented, a periodic inquiry scan 509 is issued, refreshing the Inquiry Scan Cache 507, with the period being some predetermined, and relatively lengthy, time interval; in one embodiment the period is set at five minutes, but other durations may be chosen to achieve better performance.

When the autoconfiguration service 501 requests a scan for available wireless networks, the PAN media-specific module directs a page scan to be performed for each entry in the Page Scan Cache 505. Successful attempts are added to the list of visible networks 511. The list of visible networks 511 is then concatenated with a copy of the current contents of the Inquiry Scan Cache 507 and the resulting list is reported as the visible list scan result 503.

The system depicted in FIG. 5 ensures that the autoconfiguration service 501 always obtains accurate information about preferred networks, while information about non-preferred networks will be less accurate. However, the non-preferred networks are arguably of little importance to the autoconfiguration service 501, because in the typical scenario, discovery and addition of new networks to the list of preferred networks 515 occurs very rarely. In the specific illustrated embodiment, the scanning time saved in relation to the trivial pure-inquiry-scan approach is approximately 66 percent over a period of five minutes.

In some embodiments of the invention, to ensure that the scanning operation always takes a fixed amount of time, the number of entries in the Page Scan Cache 505 is limited to five (another suitable limit can be chosen for fine-tuned performance). The scanning time would then be approximately 6.4 seconds (5*1.28 s). By keeping the entries finite in number, however, an expiration policy must be set so that roaming to other preferred but not yet visible networks is not disrupted. Whenever an entry is added to the Page Scan Cache 505, it is first given a relatively long predetermined default expiration time. In one embodiment, a 30 minute expiry period is used; another suitable default expiration period can be chosen. When an inquiry scan does not reveal this network, the Page Scan Cache entry's expiration time is reduced by five minutes until the entry is removed from the cache. If there is a connection attempt to a network that was missed in the Page Scan Cache 505, this network will be added to the cache.

The Inquiry Scan Cache 507 can also be populated by connection attempt on the part of a remote PAN device. This can be done even in embodiments of a PAN driver that fail incoming connection attempts; information about the peer is sent up to the PAN media-specific module so that it may be added to the Inquiry Scan Cache 507. This allows a peer to initiate a connection request which will then be processed by the autoconfiguration service 501 on its next network scan attempt. If the newly-added network was in the user's list of preferred networks 515, then the user need not wait for the next inquiry scan to detect it. Since it is conceivable that the user may be using a mobile PAN device and would like to be able to connect from this device to the local machine, this ensures a wait of at most 90 seconds (in the case of embodiments in which the periodic autoconfiguration scan uses a 90 second interval).

Figure 6A:
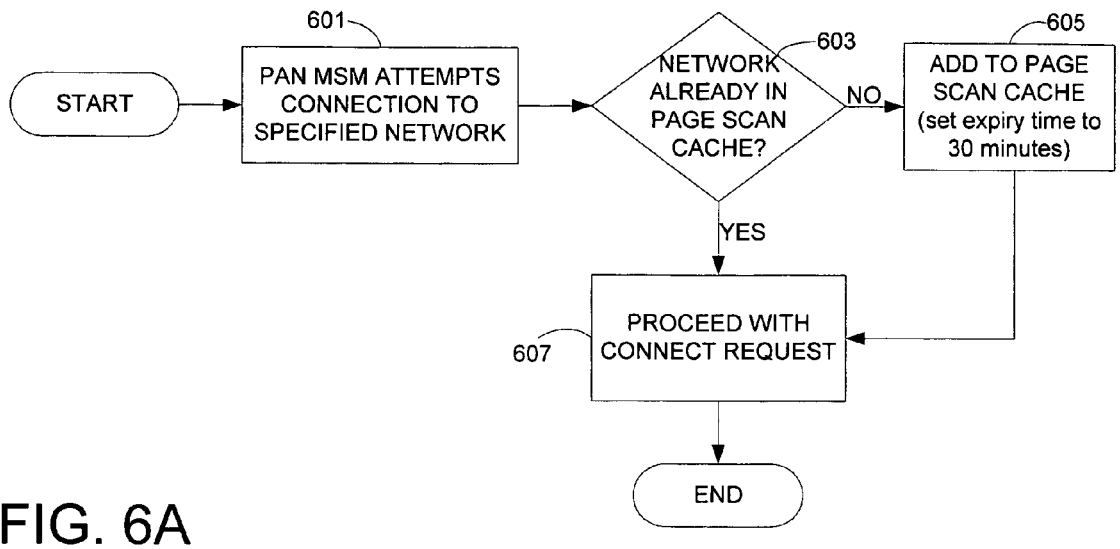
FIG. 6A is a flow diagram generally illustrating a process by which a Page Scan Cache is refreshed in accordance with an embodiment of the present invention.

FIGS. 6A, 6B, 6C, and 7 are flow diagrams generally illustrating the processes implied in the discussion above. The flow diagram of FIG. 6A illustrates the process by which the Page Scan Cache is refreshed in an embodiment of the invention. At step 601 the PAN media-specific module attempts to connect to a particular network. If the network is already included as an entry in the Page Scan Cache (step 603), the connect request proceeds in step 607. If there was a miss in the Page Scan Cache, the network is added to the cache at step 605 with an expiration time of 30 minutes, and the connect request then proceeds in step 607.

Figure 6B:
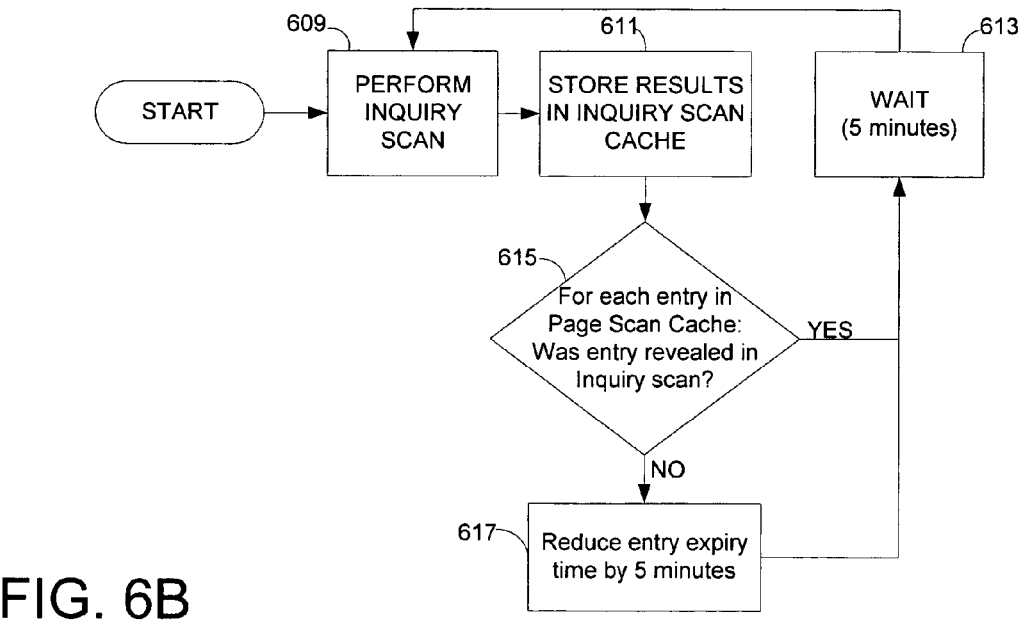
FIG. 6B is a flow diagram generally illustrating a process by which a periodic inquiry scan is used in accordance with an embodiment of the present invention.

The flow diagram of FIG. 6B illustrates the process by which a periodic inquiry scan is used in accordance with an embodiment of the invention. An inquiry scan is performed at step 609, and the results are used to populate the Inquiry Scan Cache in step 611. For each entry in the Page Scan Cache, the Inquiry Scan Cache is examined at step 615 to determine whether the inquiry scan revealed the network corresponding to the Page Scan Cache entry being considered. If the Page Scan Cache entry is not in the Inquiry Scan Cache, the expiration time associated with the entry is reduced by five minutes at step 617. A waiting period (here set at five minutes) occurs at step 613 before the cycle begins again at step 609 with a new inquiry scan.

Figure 6C:
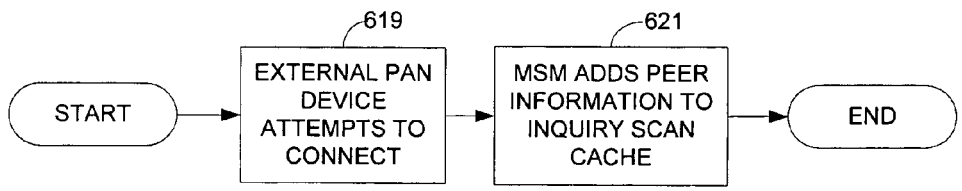
FIG. 6C is a flow diagram generally illustrating a process by which an Inquiry Scan Cache is updated by way of an external PAN device connection attempt in accordance with an embodiment of the present invention.

The flow diagram of FIG. 6C illustrates the process by which the Inquiry Scan Cache is updated by way of an external PAN device connection attempt in accordance with an embodiment of the invention. At step 619, an external PAN device attempts to connect to the local device. At step 621, the PAN media-specific module on the local device adds information relating to the peer to the Inquiry Scan Cache.

Figure 4:
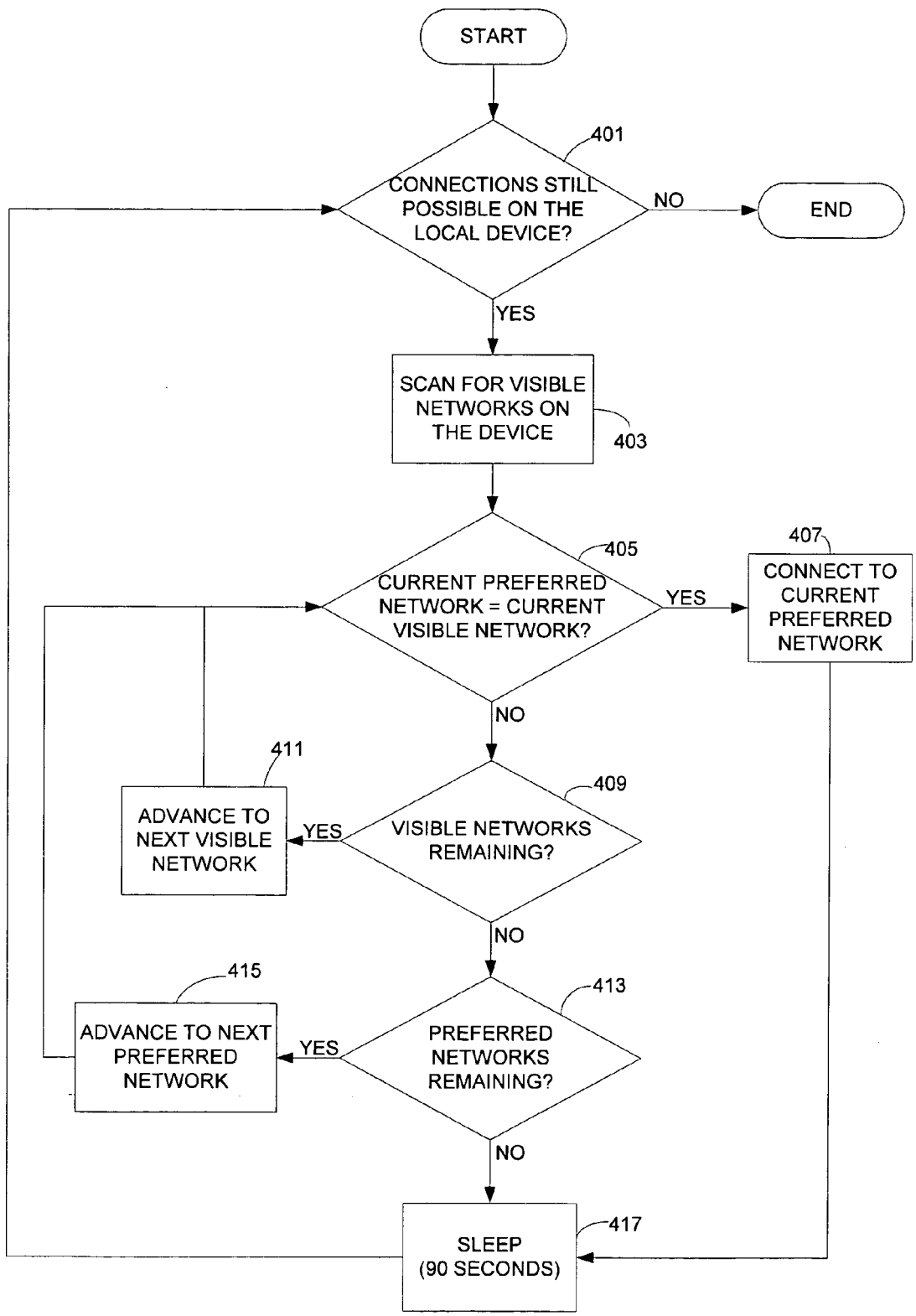
FIG. 4 is a flow diagram illustrating a basic procedure by which an exemplary autoconfiguration service performs discovery of and connection to preferred networks, on which the present invention provides an improvement.
Figure 7:
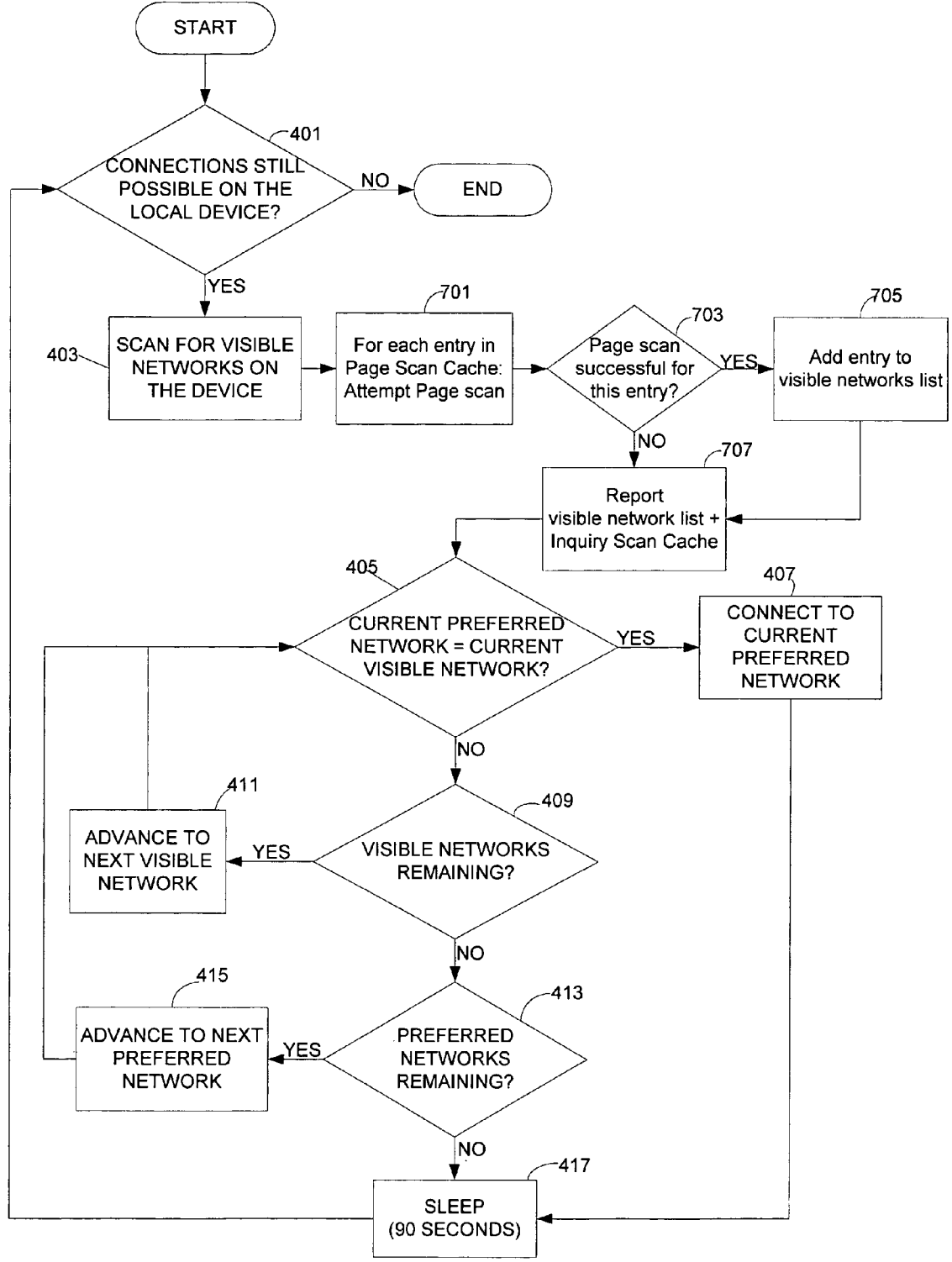
FIG. 7 is a modification of the flow diagram of FIG. 4, in which steps have been added in accordance with an embodiment of the present invention.

The flow diagram of FIG. 7 is a modification of FIG. 4, adding certain steps to the procedure by which an autoconfiguration service performs discovery of and connection to preferred networks. The modification follows the autoconfiguration service request for a scan of visible networks in step 403. For each entry in the Page Scan Cache, a page scan is attempted at step 701. If the page scan for a given entry is successful (step 703), the entry is added to the preliminary list of visible networks (step 705). At step 707, the resulting preliminary visible network list is concatenated with a copy of the contents of the Inquiry Scan Cache, and this concatenated list is reported to the autoconfiguration service. The remaining steps in the flow diagram of FIG. 7 are the same as those in the flow diagram of FIG. 4 and need not be described again here.

The term "computer-readable medium" as used in this specification, including the appended claims, comprises any medium for temporary or persistent storage of data capable of being read by a suitable computing device, including a computing device functioning as a wireless Bluetooth radio-equipped host or network node. Examples of such computer-readable media include, without limitation, volatile and non-volatile primary memory, removable and non-removable magnetic disk storage, optical disk storage, and network interface media.

The use of the terms "a," "and," "the," and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate embodiments of the invention and is not a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those having ordinary skill in the art upon reading the foregoing description. The inventors expect skilled practitioners to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for discovering and connecting to a remote device by a local device, the system comprising tangible computer-readable media having:
   an inquiry scan cache that is refreshed by a periodic inquiry scan;
   a page scan cache that is refreshed by way of an attempt to connect to at least one remote device; and
   a list of visible remote devices comprising entries in the inquiry scan cache, concatenated with each entry in the page scan cache that the local device successfully contacts by way of a page scan.

2. The system of claim 1 wherein the remote device provides a Network Access Point (NAP) service.

3. The system of claim 1 wherein the remote device provides a Group Ad-hoc Network (GN) service.

4. The system of claim 1, further comprising an automatic configuration service component that polls for the list of visible remote devices and the page scan is performed in response to the configuration service polling for the list.

5. The system of claim 1 wherein the page scan cache holds a finite number of entries and is associated with an expiration policy.

6. The system of claim 1 wherein the inquiry scan cache is additionally updated by way of an attempt by a remote Bluetooth device to connect to the local device.

7. A method for discovering and connecting to a remote device by a local device based on a list of visible remote devices, the method comprising:
   prior to receipt of a request for the list of visible remote devices:
      updating an inquiry scan cache by way of a periodic inquiry scan;
      updating a page scan cache with a corresponding entry in response to an attempt to connect to a remote device; and
   in response to a request for the list, forming the list of visible remote devices by combining at least a portion of the page scan cache with the inquiry scan cache.

8. The method of claim 7 wherein forming the list of visible remote devices further comprises:
   for each entry in the page scan cache, performing a page scan, and, if the page scan was successful, adding the entry to the list of visible remote devices.

9. The method of claim 7 wherein the page scan cache holds a finite number of entries, the method further comprising, for each entry added to the page scan cache:
   setting an expiration time for the entry;
   if the periodic inquiry scan does not reveal the entry, reducing the expiration time; and
   if the expiration time has occurred, removing the entry from the page scan cache.

10. The method of claim 7, further comprising:
    if a remote device attempts to connect to the local device, adding an entry for the remote device to the inquiry scan cache.

11. The method of claim 7 wherein the remote device provides a Bluetooth NAP service.

12. The method of claim 7 wherein the remote device provides a Bluetooth GN service.

13. The method of claim 7 wherein forming a list of visible remote devices is in response to polling by an automatic configuration service, and the method further comprises:
    comparing, within the automatic configuration service, the list of visible remote devices to a list of preferred network devices to identify a preferred network device that is visible.

14. A computer-readable storage device storing instructions implementing a method for discovering and connecting to a remote Bluetooth device by a local Bluetooth device, the method comprising:
    updating an inquiry scan cache by way of a periodic inquiry scan;
    in response to an attempt made to connect to the remote Bluetooth device, updating a page scan cache with a corresponding entry; and
    forming a list of visible remote Bluetooth devices comprising a combination of entries from the inquiry scan cache and the page scan cache.

15. The computer-readable storage device of claim 14 wherein forming the list of visible remote Bluetooth devices further comprises:
    for each entry in the page scan cache, performing a page scan, and, if the page scan was successful, adding the entry to the list of visible remote Bluetooth devices; and
    concatenating entries in the inquiry scan cache to the list of visible remote Bluetooth devices.

16. The computer-readable storage device of claim 14, further comprising, for each entry added to the page scan cache:
    setting an expiration time for the entry;
    if the periodic inquiry scan does not reveal the entry, reducing the expiration time; and
    if the expiration time has occurred, removing the entry from the page scan cache.

17. The computer-readable storage device of claim 14, further comprising:
    if a remote Bluetooth device attempts to connect to the local Bluetooth device, adding an entry for the remote Bluetooth device to the inquiry scan cache.

18. Computer-readable media storage device one or more modules implementing a system for execution on a local Bluetooth device for discovering and connecting to a remote Bluetooth device, comprising:
    an inquiry scan cache that is refreshed by an attempt to connect to the local Bluetooth device by the remote Bluetooth device;
    a page scan cache that is refreshed by way of an attempt to connect to the remote Bluetooth device; and
    a list of visible remote Bluetooth devices comprising entries in the inquiry scan cache, concatenated with each entry in the page scan cache that the local Bluetooth device successfully contacts by way of a page scan.

19. The computer-readable storage device of claim 18, wherein the local Bluetooth device comprises an operating system adapted to execute software components in either a user-mode or a kernel-mode, and the computer-readable medium further comprises a user-mode Bluetooth PAN service component.

20. The computer-readable storage device of claim 19, wherein the local Bluetooth device comprises an operating system adapted to execute software components in either a user-mode or a kernel-mode, and the computer-readable medium further comprises a kernel-mode Bluetooth PAN driver component.

21. The computer-readable storage device of claim 18, further comprising an automatic configuration service component that polls for the list of visible remote Bluetooth devices.

* * * * *

UNITED STATES PATENT AND TRADEMARK OFFICE
CERTIFICATE OF CORRECTION

| | | |
|---|---|---|
| PATENT NO. | : 8,024,487 B2 | Page 1 of 1 |
| APPLICATION NO. | : 10/724843 | |
| DATED | : September 20, 2011 | |
| INVENTOR(S) | : Bhanu et al. | |

It is certified that error appears in the above-identified patent and that said Letters Patent is hereby corrected as shown below:

In Title page, in Item (54), under "Title" column 1, line 1, delete "WIRELESS" and insert -- BLUETOOTH PAN --, therefor.

In column 1, line 1, delete "WIRELESS" and insert -- BLUETOOTH PAN --, therefor.

In column 10, line 34, in Claim 18, delete "media storage device" and insert -- storage device storing --, therefor.

Signed and Sealed this
Twenty-second Day of November, 2011

David J. Kappos
*Director of the United States Patent and Trademark Office*